July 2, 1929. J. R. McWANE Re. 17,363

MEANS FOR SUPPORTING CORE BARS IN FLASKS

Original Filed Dec. 12, 1924 2 Sheets-Sheet 1

INVENTOR
James R. McWane,
BY
Siggers & Adams,
ATTORNEYS

July 2, 1929. J. R. McWANE Re. 17,363

MEANS FOR SUPPORTING CORE BARS IN FLASKS

Original Filed Dec. 12, 1924 2 Sheets-Sheet 2

INVENTOR
James R. McWane,
BY
Siggers & Adams,
ATTORNEYS

Reissued July 2, 1929. Re. 17,363

UNITED STATES PATENT OFFICE.

JAMES R. McWANE, OF BIRMINGHAM, ALABAMA, ASSIGNOR TO McWANE CAST IRON PIPE COMPANY, OF BIRMINGHAM, ALABAMA, A CORPORATION OF ALABAMA.

MEANS FOR SUPPORTING CORE BARS IN FLASKS.

Original No. 1,578,083, dated March 23, 1926, Serial No. 755,512, filed December 12, 1924. Application for reissue filed November 21, 1928. Serial No. 320,972.

DIVISION B.

This invention relates to means for supporting core bars in flasks, such as are used in the manufacture of pipe or analogous castings by the horizontal method.

The present application is a division of my original Patent No. 1,578,083 granted March 23, 1926.

An object is to provide means for supporting core bars which will firmly grip a core bar near the ends of the flask so that free sagging of the intermediate portion of the core bar due to its weight will be prevented, and so that any rising movement of the intermediate portion of the core bar due to the floating action of the inflowing molten metal will also be resisted; the means for gripping and supporting the core bar permitting a controlled deflection of the core bar which may approximately or exactly counteract the action of the molten metal on the core bar.

A further object is to provide means of the described character which will permit dispensing with the use of chaplets, the means herein employed being designed to be readily attached to flask sections such as are already in use in horizontal pipe casting operations without the necessity for any major alterations in the same.

A full and complete understanding of the invention may be obtained from a consideration of the following detailed description taken in connection with the accompanying drawings forming a part of this specification. It will be understood that while the drawings show a preferred embodiment of the invention, it is not confined to a strict conformity with the showing of the drawings, but may be changed and modified so long as such changes and modifications mark no material departure from the salient features of the invention as pointed out in the appended claims.

Figure 1:
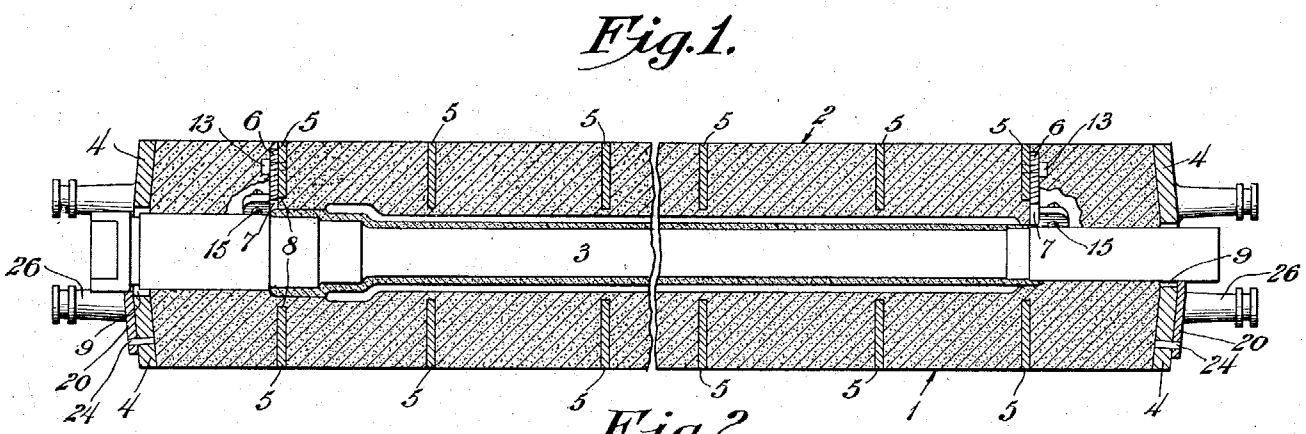
Fig. 1 is a vertical longitudinal section through a flask of a known type with core bar supports and clamping means embodying the invention shown applied thereto.

The drawings illustrate a complete flask especially designed for use in the manufacture of cast iron pipe by the horizontal method, wherein the flask is laid on the floor of the foundry in a horizontal position. The flask comprises the lower section or drag 1 and the upper section or cope 2, which are substantially identical in form, the cope being adapted to be superimposed upon and secured to the drag after the sand molds have been made therein and the core bar 3 having the sand core thereon has been placed in longitudinal position upon the drag. It will be understood that the drag provides a support for the core bar adjacent each end of the core bar. The particular flask selected for illustration is designed for the casting of two pipes simultaneously, and hence there are two core bars 3. Obviously, a single flask may be used to cast a single pipe, or a plurality of pipes, the number of pipes cast depending on the diameter thereof and on the limits imposed on the size of the flask.

Each flask section is provided with end walls 4 and a plurality of intermediate webs 5 spaced substantially equal distances apart throughout the lengths of the flask sections, said webs being preferably integral with the walls and serving to strengthen the flask and hold sand therein.

Figure 5:
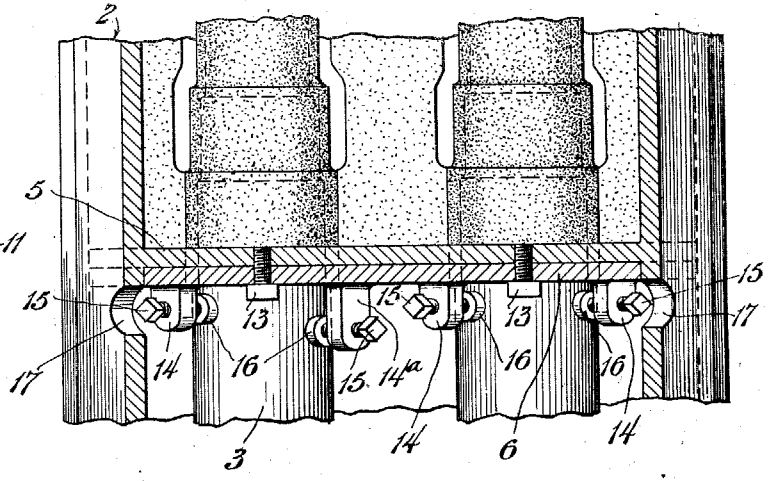
Fig. 5 is a horizontal section showing the clamping means of Fig. 4 and also portions of the cores.
Figure 4:
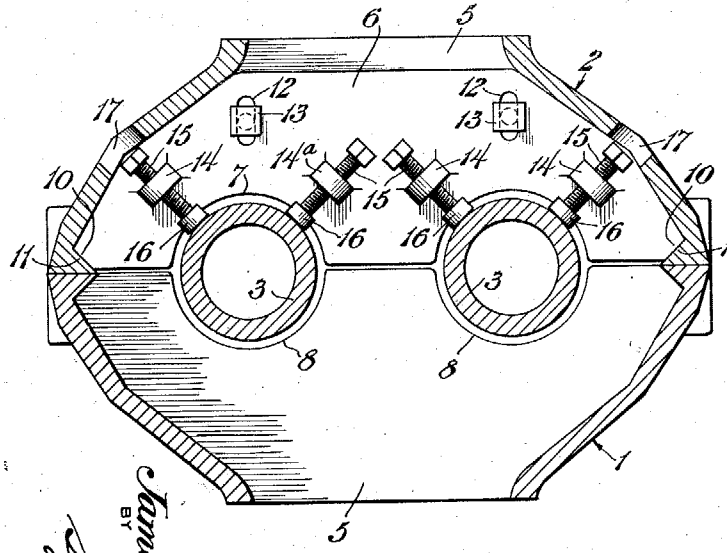
Fig. 4 is a vertical transverse section through the flask showing the upper clamping means.

As shown in Figs. 4 and 5, the transverse webs 5 next adjacent to the end walls 4 in the cope are each adapted to support a casting or plate 6 extending transversely of the cope and having the necessary openings 7 formed in its lower edge to correspond with the openings 8 of the webs 5 so as to provide a space around the core bars 3. The end walls of the cope and drag are likewise provided with matching openings 9 for the core bars, which extend beyond each end of the flask. The lower outer corners of the plates 6 are cut away as at 10 (Fig. 4) to fit against the flanges 11 formed on the side edges of the cope, thus being supported by the cope. Located preferably substantially directly over the openings 7 of the plate 6 are vertically disposed slots 12 which are adapted to receive screws 13 screwed into the adjacent web 5, said slots facilitating the assembly of the plates and securing the same to the webs after being seated upon the flanges 11.

Outstanding lugs 14 formed integral with the plate are threaded for the reception of core-bar deflecting screws 15 arranged on opposite sides of the vertical plane which passes through the axis of the core bar and at equal acute angles to said plane (preferably 45°), said screws 15 carrying swiveled heads 16 adapted to bear upon the core bar when screwed down to hold the same and at the same time resist lateral movement of the intermediate portion of the core bar in various directions.

Figure 2:
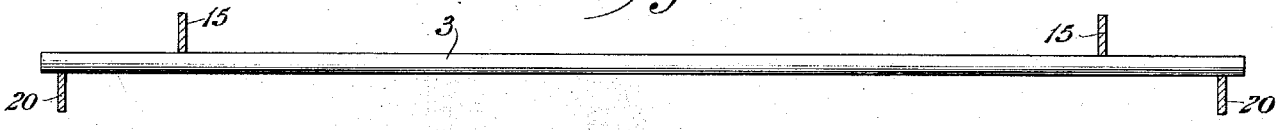
Fig. 2 is an elevation showing diagrammatically the manner in which the core bar is supported and held.

As shown in Fig. 5, one of the lugs 14ᵃ is longer than the others so as to permit offsetting of one of the inner screws relative to the other, thus making possible the tightening of the inner screws working from above the cope and using a wrench, without interference. The two outer screws 15 may be tightened through apertures 17 (Fig. 4) on opposite sides of the cope. It will be clear from the drawings, particularly Fig. 2, that when the two screws adjacent each end of the core bar are tightened, the intermediate portion of that core bar will be deflected downwardly, and that deflection of the core bar at acute angles relative to the vertical may be obtained by tightening the two screws on one side of the vertical plane which passes through the longitudinal axis of the core bar to a greater extent than the screws on the other side of said plane are tightened.

The construction so far described is specifically claimed in the parent application, and is also claimed in combination with adjustable core bar supports forming no part of this application.

Figure 3:
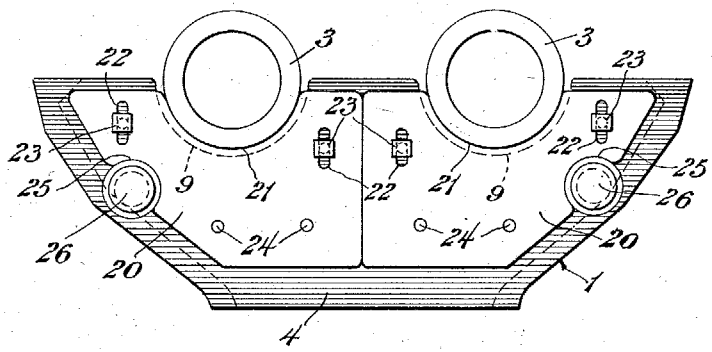
Fig. 3 is an end elevation of the drag section of the flask of Fig. 1.

The present application is directed to the combination of the core bar deflecting means just described with the core bar supporting means shown in Figs. 1 and 3, and also to the supporting means per se. The core bar supports to be described were particularly designed to be attached to drags of a construction which does not permit control of the amount and direction of deflection of the core bar. Said supports provide lateral guides for the core bar and also serve as fulcrum points when the sets of screws at the opposite ends of the core bar are tightened.

The core bar supports shown are in the form of two symmetrical plates 20 (Fig. 3) secured upon each end wall 4 of the drag, there being one plate shown for each core bar so as to permit individual positioning of the core bar supports. The plates 20 have substantially semi-circular openings or sets 21 of the proper diameter for fitting nicely and supporting the ends of the core bar, said seats being elevated above the cut-out portions 9 in the end walls 4 of the drag, as shown in Fig. 1. When adapting old forms of flasks for use with the core bar holding means of the invention, holes are drilled in the end wall of the drag and these holes are then tapped for screws or bolts. Because of possible inaccuracies in the location of these holes, the plates 20 have slots 22 through which screws 23 pass, the slots permitting adjustment of each plate prior to being secured in final position, wherein the core bars will be supported coaxially with the mold. When adjustment of each plate has been made, the screws 23 will be tightened. To obviate movement of the plates they will then be drilled, the drill holes passing into the end wall 4 and dowel pins 24 will be driven into the holes, thus making permanent the adjusted position of the plates. Further to insure rigidity of the plates, they are provided with arcuate seats 25 (Fig. 3) adapted to rest upon trunions or lugs 26 by which the drag is handled.

It will be clear that the core bar is supported wholly by the two plates 20 at the opposite ends of the drag and that the seats provided on these plates center them relative to the mold and prevent any radial movement of the core bars at the points of support. It will also be clear that due to the precautions in intially securing the plates to the drag, successive core bars will each be accurately centered at their ends. There will be a natural sagging of the intermediate portion of the core bars due to the weight of said bars; but this natural sagging does not counteract the floating effect of the inflowing molten metal. Hence, it is highly desirable to provide (as this invention does) core bar clamping means which will not merely hold the core bar deflected downwardly to a predetermined extent, but which will also permit deflection of the core bar sidewise in the direction opposite to that in which the molten metal moves as it enters the mold. Obviously, if a core bar is deflected downwardly to the proper extent and is also deflected laterally in a direction opposite to that in which the molten metal flows, the sidewise thrust due to the molten metal and also the upward lift of the molten metal will be counteracted and the core bar will finally assume a position which is so near a true coaxial position relative to the mold that the castings will be perfect, or sufficiently nearly perfect to be commercial articles.

Obviously the invention may be embodied in various forms.

What I claim is:—

1. Means for supporting core bars in flasks without the use of chaplets, comprising a plate mounted on one section of the flask and having a substantially semi-circular opening or seat for the core bar at the inner edge where the flask section joins with the other section of the flask, and means for rigidly mounting said plate on the end wall of said flask section.

2. Means for supporting core bars in flasks without the use of chaplets, comprising a plate mounted on one section of the flask and having a seat at the inner edge where one flask section joins with the other flask section, said seat supporting the extended end of the core bar and resisting downward movement of the same, and another seat provided on the plate and engaging with a projection on the end wall of the flask.

3. A flask for cast iron pipe and the like comprising, in combination, a cope; a drag; a core bar; a plate mounted on the drag section and having a substantially semi-circular opening on its inner edge where the drag section joins with the cope, said opening having the same radius as the core bar at that point and providing a seat for said core bar; and means for rigidly mounting said plate upon its flask section so that it may provide a fulcrum upon which the core bar may be rocked to effect an intermediate deflection of the core bar.

4. A flask for cast iron pipe and the like comprising, in combination, a cope; a drag; a core bar; a plate mounted on the end wall of the drag and having a substantially semi-circular opening on its inner edge where the drag joins with the cope, said opening having the same radius as the core bar at that point and providing a seat for said core bar; and means for rigidly mounting said plate upon the end wall of the drag so that it may provide a fulcrum upon which the core bar may be rocked to effect an intermediate deflection.

5. A flask for cast iron pipe and the like comprising, in combination, a cope; a drag; a core bar; a plate mounted on the end wall of the drag and having a substantially semi-circular opening on its inner edge where the drag joins with the cope, said opening having the same radius as the core bar at that portion of its length and providing a seat for said core bar; and means for rigidly mounting said plate upon the end wall of the drag; another plate secured transversely within the cope at right angles to the core bar; screw-threaded members mounted on the plate at acute angles to the vertical plane which passes through the longitudinal axis of the core bar and engageable at their ends with the core bar to deflect or create a pressure on the core bar, the seat aforesaid then serving as a fulcrum for the core bar.

6. A flask for cast iron pipe and the like comprising, in combination, a cope; a drag; and a core bar; a plate extending transversely of the drag and secured thereto and having an arcuate seat receiving the core bar and preventing downward movements thereof and also sidewise movements at the point of support, but permitting the core bar to be lifted off the seat; and means spaced from the plate and carried upon the cope between the ends thereof for exerting a downward pressure on the core bar to deflect the same intermediately, said seat then providing a fulcrum for the core bar.

7. A flask for cast iron pipe and the like comprising, in combination, a cope; a drag; and a core bar extending longitudinally of the flask; a plate secured to each end of the drag and extending transversely relative to the core bar; each plate having its upper edge provided with a generally arcuate cut-out portion which is of such size as to provide a seat for the core bar and which is so located relative to the molding space that the core bar ends are initially centered relative to the longitudinal axis of said space and the core bar is supported entirely by the two seats at the opposite ends of the flask; the seats fitting the core bar so that lateral movement in various directions at the points of support is prevented; and means on one of the flask sections for clamping down the core bar upon its seats; said clamping means being within the confines of the flask and being adjustable to deflect the intermediate portion of the core bar downwardly to a sufficient extent substantially to counteract the upward deflection caused by the molten metal.

8. A flask for cast iron pipe and the like comprising, in combination, a cope; a drag; and a core bar extending longitudinally of the flask; a plate secured to each end of the drag and extending transversely relative to the core bar; each plate having its upper edge provided with a generally arcuate cut-out portion which is of such size as to provide a seat for the core bar and which is so located relative to the molding space that the core bar ends are initially centered relative to the longitudinal axis of said space and the core bar is supported entirely by the two seats at the opposite ends of the flask; the seats fitting the core bar so that lateral movement in various directions at the points of support is prevented; and elements interposed between the cope and the core bar and so constructed and arranged as to exert pressure on the core bar in directions radial thereof, said elements being on opposite sides of the vertical plane which passes through the longitudinal axis of the core bar, and acting together to deflect the intermediate part of the core bar directly downwardly, and acting individually to deflect the core bar in a direction at an acute angle to the vertical.

9. A flask for cast iron pipes and the like comprising, in combination, plates secured to the drag at each end wall thereof; each of said plates having a seat at the upper edge for the core bar; said seats preventing any lateral movement of the core bar at the points of support except removal by direct upward lifting; the end walls of the drag each having an outwardly projecting trunnion; the plates having cut-out portions which fit against the trunnion so that the plates are partially supported by the trunnions.

10. In combination, a flask of the type employing core bars for horizontal casting of pipe and the like; and means to adapt the flask for use with core bar deflecting means, comprising plate-like members carried adjacent the opposite ends of the drag section of the flask and each having a seat for supporting and holding a core bar near its end; the plate-like members being immovably secured to the drag with their core bar seats exactly centered relative to the longitudinal axis of the mold.

11. A flask for casting iron pipe and the like horizontally comprising, in combination, a drag, and a cope; a plate having slots; screws passing through the slots to hold the plate adjustably secured to the end wall of the drag; and dowel pins driven through holes bored in the plate and the end wall of the drag to secure the plate immovably to the drag; the plate having a seat at its upper edge for a core bar.

12. A flask for casting iron pipe and the like horizontally comprising, in combination, a drag, and a cope; a pair of plates arranged in the same plane and mounted on each end wall of the drag; means to hold each plate separately on the drag, said means permitting adjustment of the positon of the plate; and means to secure each plate rigidly upon the drag; each plate having a seat for a core bar.

13. A flask for the manufacture of cast iron pipe and the like by the horizontal method comprising, in combination, a drag provided with immovable seats, one at each end, for a core bar, said seats centering the core bar at its ends relative to the mold and so fitting the core bar as to prevent lateral movement thereof at the points of support; and adjustable means carried by the cope and adapted to contact with the core bar at points spaced from its ends so as to deflect the intermediate portion thereof in a generally downward direction, with the seats serving as fulcrums for the core bars.

14. A flask for the manufacture of cast iron pipe and the like by the horizontal method comprising, in combination, a drag provided with immovable seats, one at each end, for a core bar, said seats centering the core bar at its ends relative to the mold and so fitting the core bar as to prevent lateral movement thereof at the points of support; and adjustable means carried by the cope and adapted to contact with the core bar at points spaced from its ends so as to deflect the intermediate portion thereof in a generally downward direction, with the seats serving as fulcrums for the core bars; said adjustable means being in pairs the elements of which are symmetrically disposed on opposite sides of the core bar and exerting pressure thereon in lines at 45° relative to the vertical plane passing through the axis of the core bar.

In testimony, that I claim the foregoing as my own, I have hereunto affixed my signature.

JAMES R. McWANE.